(12) United States Patent
Qin et al.

(10) Patent No.: US 7,895,205 B2
(45) Date of Patent: Feb. 22, 2011

(54) USING CORE WORDS TO EXTRACT KEY PHRASES FROM DOCUMENTS

(75) Inventors: Shi Qin, Beijing (CN); Pei Yue, Beijing (CN)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 12/041,677

(22) Filed: Mar. 4, 2008

(65) Prior Publication Data

US 2009/0228468 A1    Sep. 10, 2009

(51) Int. Cl.
*G06F 7/00* (2006.01)
*G06F 17/30* (2006.01)

(52) U.S. Cl. ...................................... 707/736
(58) Field of Classification Search .......... 707/999.006, 707/736
See application file for complete search history.

(56) References Cited

U.S. PATENT DOCUMENTS

| | | | |
|---|---|---|---|
| 5,745,602 A | | 4/1998 | Chen et al. |
| 5,819,260 A | * | 10/1998 | Lu et al. ............................ 1/1 |
| 6,098,034 A | * | 8/2000 | Razin et al. .................... 704/9 |
| 6,104,990 A | | 8/2000 | Chaney et al. |
| 6,470,307 B1 | | 10/2002 | Turney |
| 6,571,240 B1 | * | 5/2003 | Ho et al. ............................ 1/1 |
| 7,096,179 B2 | | 8/2006 | Zhu et al. |
| 7,249,312 B2 | | 7/2007 | Jasper et al. |
| 2003/0167245 A1 | | 9/2003 | Murata |
| 2007/0067157 A1 | | 3/2007 | Kaku et al. |
| 2007/0112764 A1 | | 5/2007 | Yih et al. |
| 2007/0156732 A1 | | 7/2007 | Surendran et al. |

OTHER PUBLICATIONS

Wu, et al., "Automating Keyphrase Extraction with Multi-Objective Genetic Algorithms", Proceedings of the Hawaii International Conference on System Science, HICSS, CD ROM, 2003. University of California at Berkeley, Berkeley, CA, pp. 1-8.
Turney, "Learning to Extract Keyphrases from Text", published as NRC/ERB-1057, 99, Feb. 17, NRC 41622. Copyright 1999, pp. 1-43.
Ganapathiraju, et al., "Relevance of Cluster size in MMR based Summarizer: A Report", Nov. 26, 2002, pp. 1-22.
Hammouda et al., "CorePhrase: Keyphrase Extraction for Document Clustering", pp. 1-10, 2005.

* cited by examiner

*Primary Examiner*—Mohammad Ali
*Assistant Examiner*—Alexey Shmatov
(74) *Attorney, Agent, or Firm*—L. Alan Collins; Collins & Collins Incorporated (57) ABSTRACT

Described is a technology, such as for use in information retrieval, by which key phrases (e.g., the phrases most relevant to a document) are extracted from a document based upon core words in that document (e.g., the words most relevant to the document). Various relevance features of each candidate word may be used to score and rank the candidate words relative to one another and thereby determine the core word or core words. The core word or words may be used to filter a document's phrases into candidate phrases, and/or used to determine core word feature values associated with each candidate phrase. The features of each candidate phrase, one or more of which may be based on the presence or absence of core words in the candidate phrase, are used to rank the candidate phrases, with the top-ranked candidate phrases being the key phrases associated with the document.

13 Claims, 4 Drawing Sheets

USING CORE WORDS TO EXTRACT KEY PHRASES FROM DOCUMENTS

BACKGROUND

There is an enormous amount of content available on the Internet, as well as on other sources such as private enterprise networks. Given the amount of content, information retrieval technology is extremely valuable in locating a relevant document or a relatively small number of documents from which a user may select.

One of the ways that information retrieval technology locates relevant documents is by extracting the key phrases from documents, where in general, key phrases represent the main topic and principal information of the document. Once extracted, key phrases may be used to match documents to online search queries, for example.

As can be readily appreciated, end users and machines benefit from correctly extracted key phrases. For example, businesses, educational institutions, the scientific community and so forth require that key phrases are extracted correctly, to a high degree of confidence, with acceptable performance.

Nevertheless, known contemporary key phrase extraction technology is far from perfect. For example, one problem with contemporary key phrase extraction technology is that known solutions return a considerable number of incorrect "noise" phrases among the key phrases, even when only a small number of extracted key phrases per document are considered. Any improvement in extracting more relevant key phrases from documents is thus valuable in information retrieval.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which core words are extracted from a document, and then used in extracting key phrases from the document. The core words may be used to filter a document's phrases into candidate phrases by requiring that all candidate phrases contain at least one key word, (e.g., one key word, two key words, all key words and so forth as set by filtering criterion). As an alternative or as a supplement to filtering, the presence or absence of one or more core words in a given candidate phrase may be used as a feature value of that phrase in computing relevant key phrases based on features of each phrase.

In one aspect, extracting the core word set comprises selecting candidate core words from the document and determining feature values for features of the candidate core words. The features, which may be weighted relative to one another, are used to compute a relevance score associated with each candidate core word. The candidate core words are then ranked according to their respective scores to determine the core words, e.g., the top M (e.g., two) scoring candidates are selected as the core words of this document.

In one aspect, extracting the key phrases comprises selecting candidate key phrases from the document and determining feature values for features of the candidate key phrases. Filtering based on the core words optionally may be used in extracting the candidate key phrases. One (or more) of the feature values may be based on the core words; for example, a feature value may be based on whether a core word or core words (and if so, how many core words) occur in each candidate phrase. The key phrase features, which may be weighted relative to one another, are used to compute a relevance score associated with each candidate key phrase. The candidate key phrases are then ranked according to their respective scores to determine the key phrases, e.g., the top N (e.g., three) scoring candidates are selected as the key phrases of this document.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards determining (to a high likelihood) relevant key phrases in a document, (where "document" refers to a set of one or more documents). To this end, core words are first selected from the document, and then used in determining the (likely most) relevant key phrases. As can be readily appreciated, this is valuable in information retrieval in general, and is particularly beneficial in situations in which the total amount of key phrases is limited to a small number.

In one aspect, the document comprises a text document, which for example may be a single document or a set of combined (e.g., concatenated) documents. However, while many of the examples described herein are directed towards processing text documents, it will be readily understood that other types of documents, such as those containing binary data or mixed types of data, may use the technology described herein, as long as the content may be grouped in some meaningful way, (e.g., like the way spaces separate words). As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, information retrieval and/or document processing in general.

Figure 1:
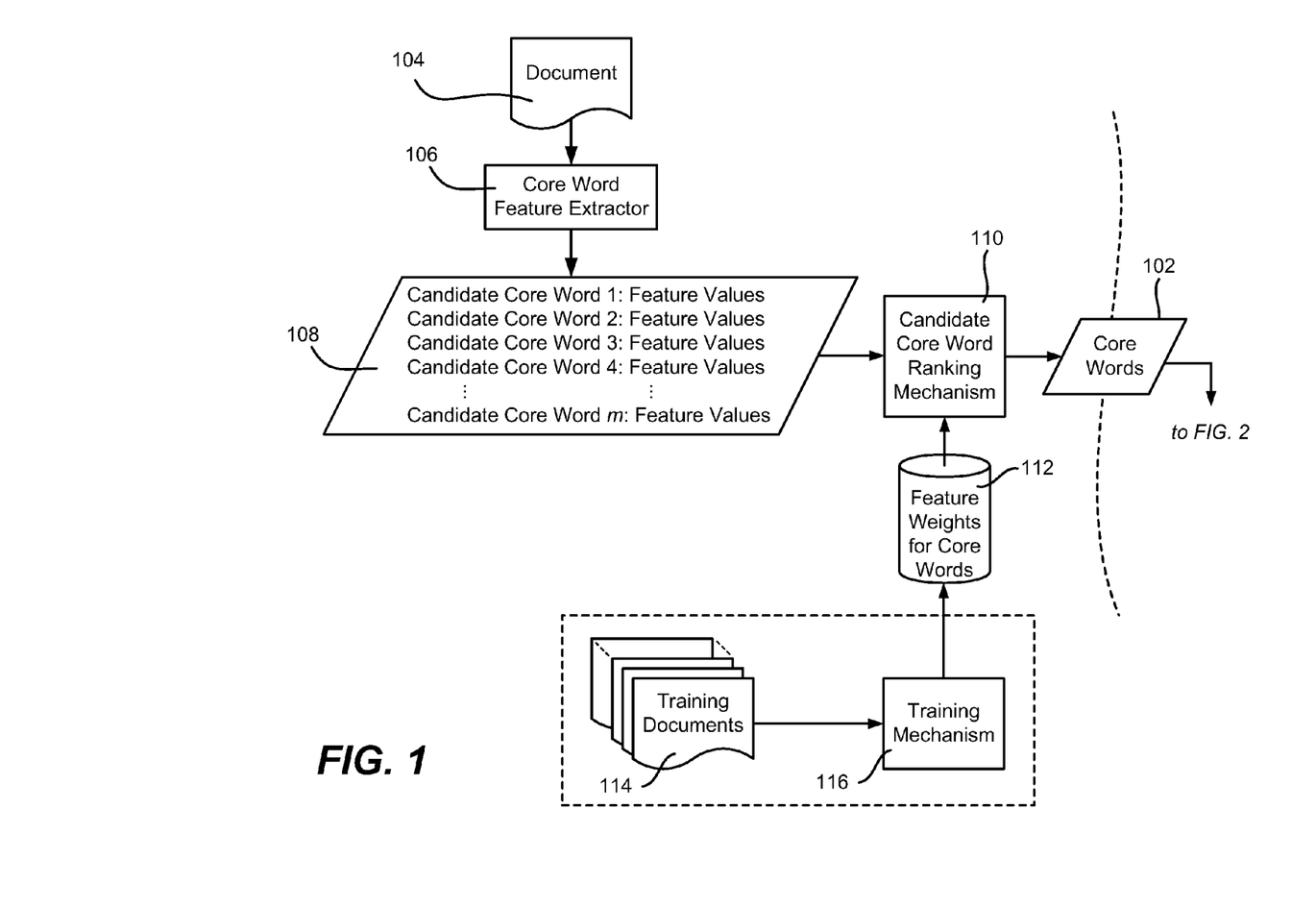
FIG. 1 is a block diagram representing example components for extracting core words from a document.

Turning to FIG. 1, there is shown a general block diagram representing example components for extracting core words 102 from a given document 104, in which each "core word" is generally defined as one of the most significant words (to a high probability) of a document, which in one aspect (among other aspects), helps describe the major topic of a specified document. The concept of a "core word" is also applicable to other information retrieval algorithm aspects, e.g., a "core word" may be used as input for document classification, content sensitive detection, and so forth. In general and as described below, the core words 102 extracted from the document 104 are later used in key phrase extraction, in that the core words 102, considered alone or with other associated words, typically represent the key phrases of the text document. Note that ordinarily a document will comprise a single document; however any group of multiple documents may also benefit from key phrase extraction, such as to find the key phrases associated with a website having multiple documents therein, find the key phrases associated with a file folder having multiple documents therein, and so forth.

In general, core word feature extractor logic 106 processes the document 104 and obtains feature values (e.g., counts and yes/no-type answers) for each candidate word in the document 104, and associates the candidate words with their respective feature values, e.g., as (candidate, feature value set) pairings 108. Certain words like "a" or "the" which are unsuitable as core words, need not be considered when collecting feature values.

In one example implementation, the core words 102 are extracted from among the candidates based on values for each candidate with respect to a number of features, such as a count of how often the candidate word appears in the document; other example features are set forth below. Using these (candidate, feature value set) pairings 108, in which the features may be weighted relative to one another, each candidate word is given a score that reflects that word's relevance to the document 104 and thereby the extent to which the word describes the major topic.

For example, as represented in FIG. 1, candidate core word ranking logic exemplified as a mechanism 110 uses feature weights 112 (obtained via training or the like) to compute a total score for each candidate core word. Based on the total scores, the top M candidate core words (e.g., where M is on the order of one, two or three) are then established as the actual core words 102. Note that a single component may contain the logic for the core word feature extractor logic 106 and the candidate core word ranking mechanism 110.

With respect to example features that indicate the importance of each candidate word in a document, in general such features may include TF-IDF (term frequency-inverse document frequency), query frequency, a word's part of speech, the word position of its first appearance, the sentence position of its first appearance, whether the word appears in a title, and so forth. The table below summarizes example features used in one example implementation, wherein the document corresponds to a web page:

| Feature | Description |
| --- | --- |
| MB frequency | The MB (main block) frequency; frequency of a word in the main block or blocks, not considering the noise block or blocks. |
| NB frequency | The (noise block) frequency; frequency that a word occurs in the noise block or blocks. |
| First position | Position of the first occurrence in the main block of a word. The feature value equals the ratio of the number of words before its first occurrence to the number of total words in the main block. |
| Meta | Indicates whether a word occurs in the keyword or description meta field of the document. If yes, the feature value is set to 1, otherwise, it is set to 0. |
| Title | Indicates whether a word occurs in the title of the document. |
| Title score | A document may have candidate titles; each may be assigned a title score, and each word in |

-continued

| Feature | Description |
| --- | --- |
| | that candidate title is assigned this title score. |
| Goodness | Indicates whether a word is "good" enough for topic representation based on document frequency (df, below). |
| DF (Document frequency) | The number of documents in which the word occurs. An example data set for DF calculation is a large web directory. |

Given some or all of these (and possibly one or more other) feature values, each of the candidate core words may be scored relative to one another. However, not all features need to be given the same weight. To this end, offline or online training may be performed, (as represented in FIG. 1 by the dashed box indicating that training may have been performed at a previous time), such as by using training documents 114 and a training mechanism 116 to determine the weights to assign to each of the features. In general, the training mechanism 116 takes a number of documents 114 that have been carefully reviewed and/or specially created to each have a known correct core words result, and repeatedly adjusts the feature weights until actual results match well with the known correct results. Logistic regression is a method used in one suitable training mechanism. As can be readily appreciated, the core word feature set and/or the feature weights may be adjusted as desired depending on individual circumstances.

To rank the candidate core words according to their feature scores using the weights, the relevant score of each of the candidate core words is computed, and then the candidates are ranked to each one's computed score. The top M (typically one or two) words are considered as the core word or words 102 of this document 104. Note that some analysis may be used to save computations, e.g., if it is determined that any given word has to have a certain feature value of at least X to have a computed score that has a chance of being greater than the already-computed scores for other words, there is no need to compute a score for any word with that certain feature value less than X.

In one example implementation, to compute a candidate word's score, the ranking mechanism 110 calculates the linear sum S of the feature values as weighted according to corresponding coefficients. Note that intersection is a constant item. With the weighted sum S, the following function is used to calculate a final score:

$$\text{score} = \frac{\exp(S)}{\exp(S) + 1}$$

This final score is the total feature score used for ranking the word with respect to the final scores of other words to determine the core words 102.

Figure 2:
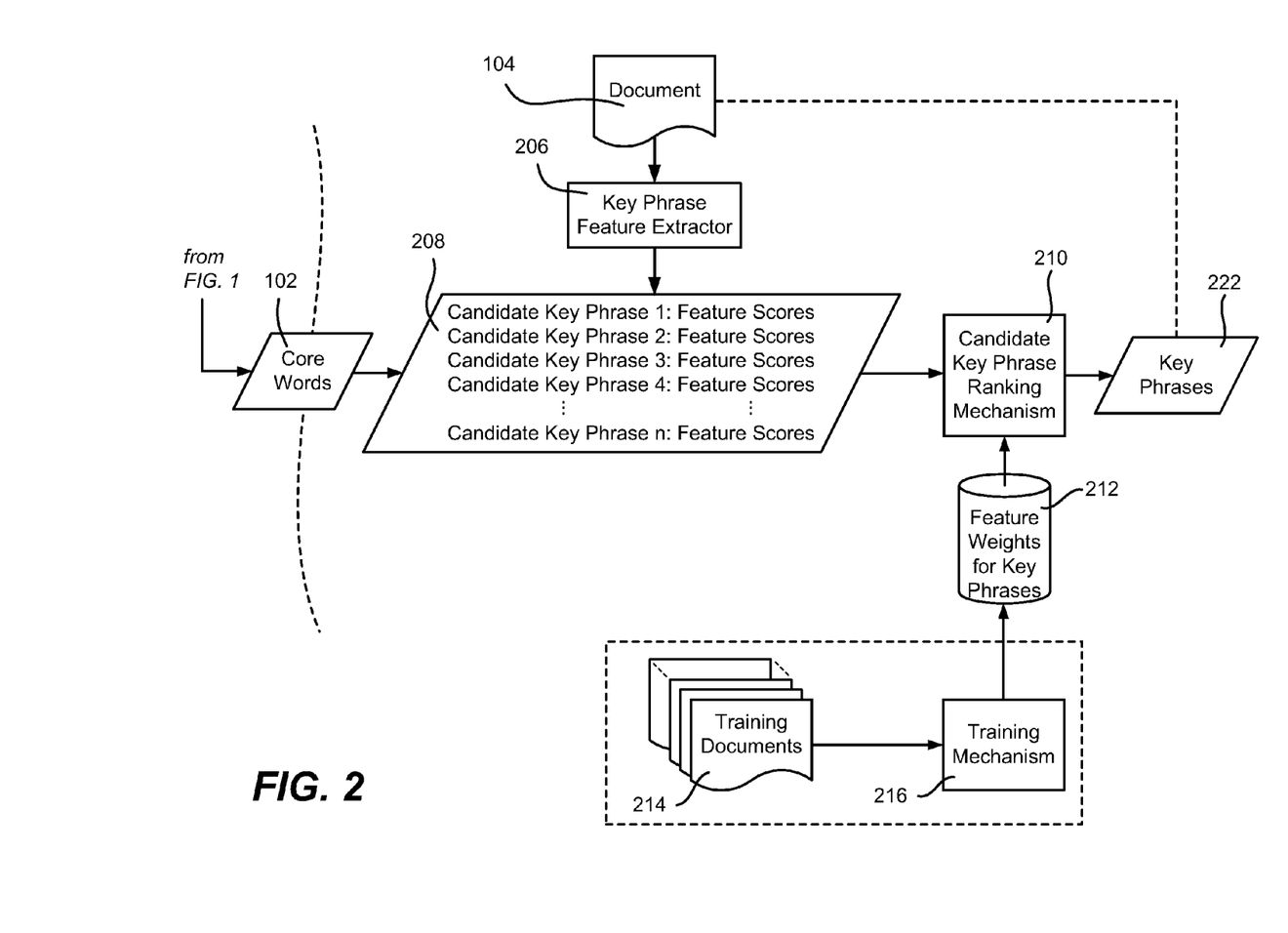
FIG. 2 is a block diagram representing example components for extracting key phrases from a document, in which core words are used in the key phrase extraction.

Turning to FIG. 2 and the use of the core words 102 in determining the key phrases of the document 104, in general the core words 102 may be used in different ways. One way is to use the core words as a filtering mechanism such that only phrases that contain a core word (or core words, such as all, or at least two out of three and so on), may be considered as candidates for being a key phrase. Another way is to use the core words as a feature when computing scores for ranking candidate key phrases, e.g., whether a candidate phrase contains a core word, all core words, at least two of three and so on, may be a weighted feature mathematically combined (e.g., summed) with other weighted features. Further, core words may be used in a combination of filtering and feature usage; for example, one core word may be used as a filter and another as a feature. As another example, filtering may be such that candidate phrases need to contain at least one core word, but via feature-based ranking, a candidate phrase with more than one core word likely will rank higher than a phrase with only one core word.

As generally represented in FIG. 2, a key phrase feature extractor logic 206 first extracts candidate key phrases from the document in association with a set of feature values for each candidate. These (candidate, feature set) pairings 208 are then used in ranking the candidates, as described below. Note that as described above, the key phrase feature extractor logic 206 optionally may perform core-word based filtering to reduce the number of candidates.

Given the pairings 208 of candidates and their respective feature set scores, candidate key phrase logic exemplified as a mechanism 210 computes a feature-based total score for each candidate, selects the top N (e.g., two or three) as the key phrases 222 for this document 104, and associates the key phrases 222 with the document 104 in some way. The association is indicated by the dashed line between the document 104 and key phrases 222 in FIG. 2, and may be in the form of key phrase list or other suitable data structure and/or metadata associated with the document 104. As with core word computations, each of the features may have different weights 212 (e.g., coefficients) in the computation; training documents 214 and a training mechanism 216 (e.g., using a logistic regression training method) may be used to determine such feature weights 212.

In one example implementation, the following set of example features/descriptions are used to compute a total score for ranking the candidate phrases:

| Feature | Description |
| --- | --- |
| Phrase Frequency Frequency Score | The frequency of a phrase appearing in the non-noise block(s). For each short segment index i in S (e.g., the number of words in a short segment is less than four), calculate its frequency score as: $$FS(Seg_i) = \frac{1}{|Seg_i|} \sum_{k=1}^{|Seg_i|} WF(Seg_i(k))$$ where function WF(x) returns the frequency of the word x in the document, $Seg_i(k)$ returns the k word of $Seg_i$ and $|Seg_i|$ is the number of words $Seg_i$ contains. |
| Visual Style Score | Let MAX(FS) be the max value of the frequency scores of all short segments. For each short segment index i in S, calculate its visual style score as: IF $Seg_i$ has BOLD attribute   BS(Seg(i)) = MAX(FS)/2 ELSE   BS(Seg(i)) = 0 IF the style name of $Seg_i$ is different from those of $Seg_{i-1}$ and $Seg_{i+1}$   STS(Seg(i)) = MAX(FS)/4 ELSE   STS(Seg(i)) = 0     VS(Seg(i)) = BS(Seg(i)) + STS(Seg(i)) |
| Struct Score | For each short segment index i in S, calculate its structure score as: |

-continued

| Feature | Description |
| --- | --- |
| | $$SS(Seg_i) = \sum_{k=1}^{m} Length(Seg_{i-k}) \times \alpha^{k-1} + \sum_{k=1}^{n} Length(Seg_{i+k}) \times \alpha^{k-1}$$ where function Length(x) returns the number of words a segment contains, α is a positive factor less than 1, and m and n are the backward and forward span distances, respectively. |
| Title Meta Word Count | The value of this feature equals the number of words the phrase contains, which appear in the title or meta field of the document. |
| Query Frequency | This feature represents how many times this particular phrase is queried by users. The value is retrieved from a Query Log Dictionary. |
| First Position | This feature indicates the position of the first occurrence of a phrase in main block. The value is set to the ratio of the number of words appearing before the first occurrence of the phrase against the total amount of words in main block. |
| Average Tfidf | Average Tfidf value of a candidate phrase is the arithmetic average of the composing words' Tfidf values. The calculation of average Tfidf value of a candidate phrase is: $$AvgTFIDF(P) = \sum_{i=1}^{|W|} TFIDF(W_i)/|W|$$ Where P is the candidate phrase, $|W|$ is the number of words P contains, $W_i$ is the i word of P and function TFIDF(x) is the Tfidf value of the word x. |
| Contains Core Word | "Core Word" is defined as the first M (e.g., 2) words with the highest word relevance score calculated during word ranking. In one example, this feature indicates how many core words one particular phrase contains. For example, if the number of core words is limited to two, the value of this feature ranges from zero to two. |

To calculate each candidate phrase's relevance score S, the linear sum of the feature values times their corresponding feature weight coefficients may be used.

Note that intersection is a constant item. The following function is used to calculate the final logistic score, where S' is the weighted sum for candidate phrases:

$$score' = \frac{\exp(S')}{\exp(S') + 1}$$

For each candidate phrase, the computed final score, score', is used in phrase ranking to establish the top N key phrases.

Other aspects and alternatives include that a phrase may be considered as containing a core word if the phrase contains the exact core word or any extensions and/or derivatives of that core word. For example, if the core word is "computer," then words such as "computing," "computerize," "computerized" or the like may also be considered as "core words" with respect to whether a core word is contained within a given phrase. Similarly, a core word such as "telephone" may be considered present in a phrase that contains the word "phone" or the like. Thus, a "core word" may be considered the exact word and/or any extensions and/or derivatives of that exact word.

In one alternative, the feature weights need not be the same, e.g., a phrase containing one core word may be given a feature value of one, while a phrase containing an extension and/or derivative may be given a feature value of 0.75 or some other number between zero and one. Indeed, the feature values may vary among different types of extensions and/or derivatives, e.g., the more letters that match, the higher the feature value.

Yet another alternative is to have feature values for a phrase's core words that are based on their original core word scores. For example, consider that the top two core words extracted from a document were "computer" and "basketball," in which "computer" had a total score that was larger than the total score for "basketball." The respective core word scores may be used to vary the phrase's core word feature value of each, instead of simply adding one to the core word feature value for each one of the core words a given phrase contains. In this manner, for example, the phrase "play computer games" is given a larger core word feature value than the core word feature value for the phrase "play basketball games" because of the larger original core word score of "computer" relative to "basketball."

Considering another aspect of core-word filtering versus core-word usage as feature values, a dynamic decision may be made for a given document or set of one or more conditions. For example, if the number of key phrases that is required to be associated with a document exceeds a threshold (e.g., greater than four), it may be inappropriate to use filtering to limit the key phrases to only those that contain a core word (or both core words, and so on). When processing documents, the threshold may be evaluated to determine whether the required key phrase number exceeds it; if not, filtering is performed, otherwise the core word or words are used as a feature of the phrase. Note that filtering may still be used in conjunction with core-word feature values, and one or more thresholds may be evaluated to determine the level of filtering and/or core-word feature usage. Note further that there may be multiple sets of feature weights (coefficients) depending on whether and to what extent core words are used as features and/or for phrase filtering.

Figure 3:
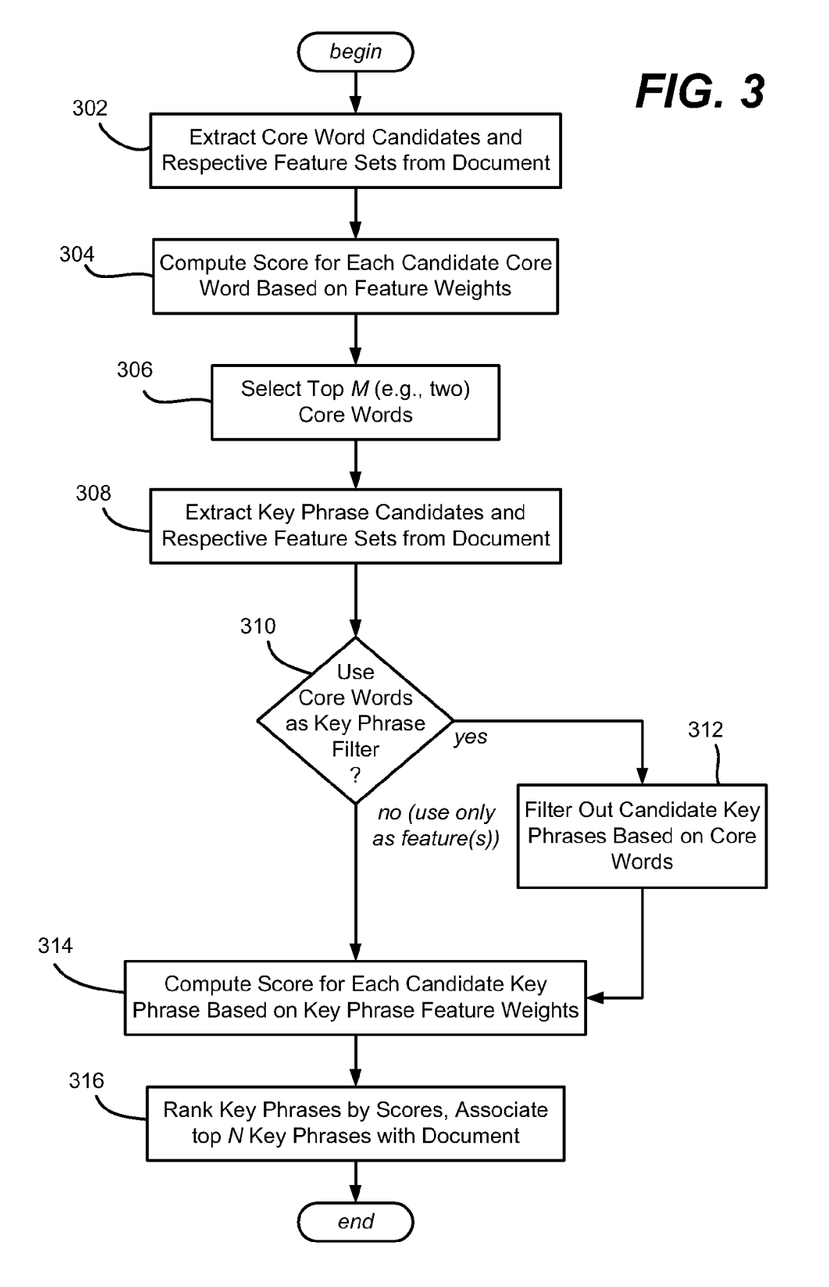
FIG. 3 is a flow diagram showing example steps taken to extract core words from a document, and to use those core words in extracting key phrases.

By way of summary, FIG. 3 is a flow diagram showing example steps in using one or more core words extracted from a document to determine one or more key phrases associated with that document; note that although FIG. 3 refers to a document, it is understood that the example logic applies to any set of documents combined in some way.

Step 302 represents extracting the candidate core words and their respective feature sets from a document. Step 304 represents computing the scores for each candidate core word, with step 306 representing selecting the top M core words for later use in key phrase determination.

Step 308 represents extracting the candidate key phrases and their respective feature sets from a document. The core-word filtering option is represented by steps 310 and 312, which as described above may be performed in various ways or not performed at all, and/or may be dependent on at least one threshold evaluation. Step 312 represents filtering if this option is appropriate.

Step 314 represents computing the scores for the candidate key phrases (the number of which may or may not have been reduced by any filtering at step 312) based on each one's feature values. Step 314 may include using core words in the features, and indeed will do so if no core-word filtering is performed. Step 316 represents ranking the candidate key phrases by their respective computed scores, and associating the top N candidate phrases as the key phrases for this document.

As can be readily appreciated, while it is generally a difficult problem to directly determine the key phrases of a given document, the use of core words as an indirect assisting mechanism facilitates the final determination in a manner that. Filtering and/or feature score computations based on the core words improves on other solutions for finding the key phrases of a document.

Exemplary Operating Environment

Figure 4:
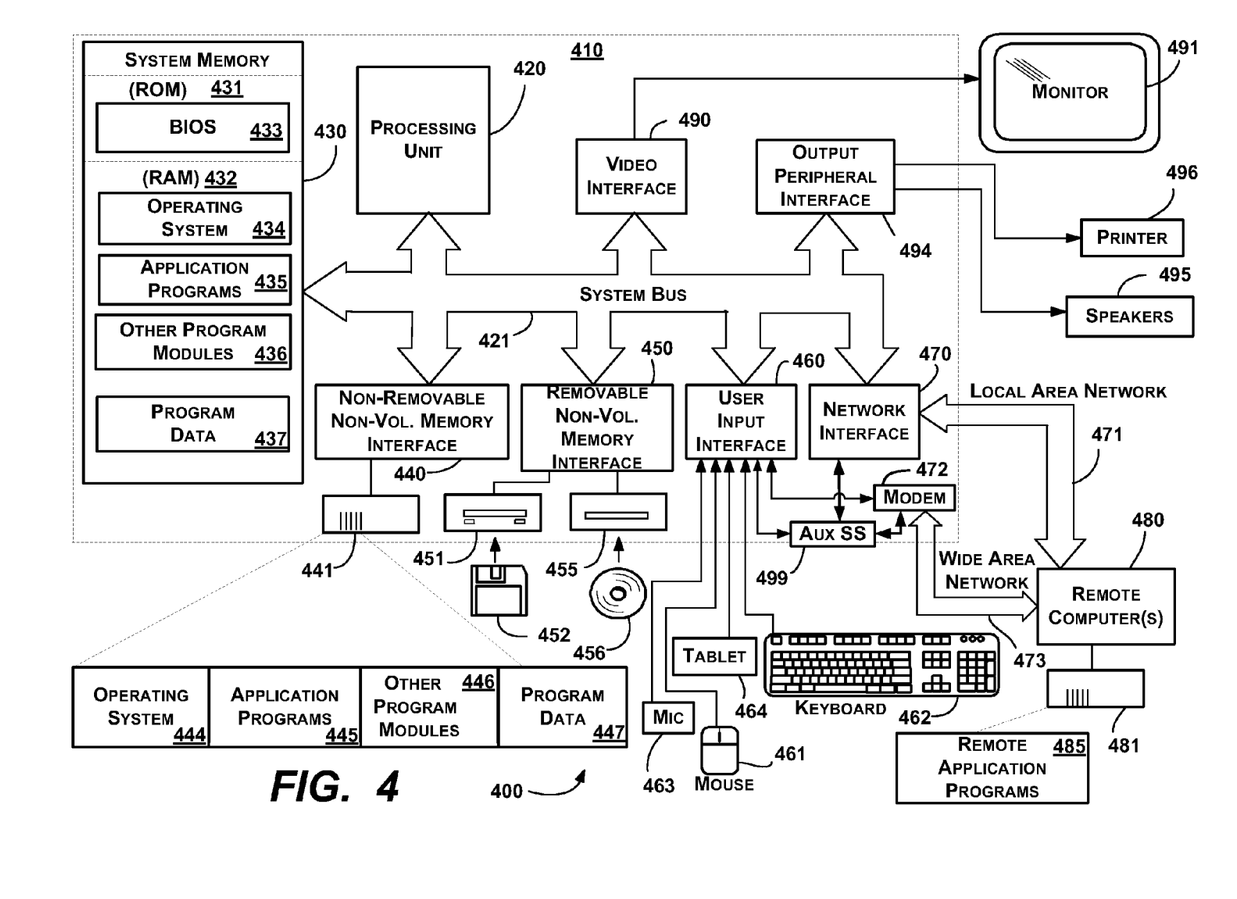
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. For example, the core word extractor logic 106, core word ranking mechanism 110, key phrase extractor logic 206 and/or key phrase ranking mechanism 210 may be implemented in the computer system 410. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   selecting candidate core words from a document;
   determining a feature value for each of a plurality of features of each of the selected candidate core words;
   calculating a score for each selected candidate core word, wherein each score is based on a linear sum S of each of the plurality of feature values of the each selected candidate core word, and wherein the each of the plurality of feature values is weighted according to a corresponding coefficient, and wherein the each score=exp(S)/exp(S)+1;
   selecting, based on the calculated scores, M of the selected candidate word set as a core word set from the document where M is an integer that is greater than zero;
   selecting candidate key phrases from the document;
   determining a phrase feature value for each of a plurality of phrase features of each selected candidate key phrase; and
   associating with each candidate key phrase at least one of the plurality of feature values of at least one of the core words of the selected core word set;
   calculating a phrase score for each selected candidate key phrase, wherein each phrase score is based on a phrase linear sum P of each of the plurality of phrase feature values of the each key phrase, and wherein the each of the plurality of phrase feature values is weighted according to a corresponding phrase coefficient, and wherein the each phrase score=exp(P)/exp(P)+1;
   ranking the selected candidate key phrases relative to one another based on the calculated phrase scores; and
   wherein the method is performed by a computing device.

2. The method of claim 1 further comprising, selecting, based on training data, at least one of the corresponding coefficients.

3. The method of claim 1 further comprising, ranking the selected candidate core words relative to one another based on the calculated scores.

4. The method of claim 1 wherein the extracting the key phrase set comprises:
   filtering out, from a candidate key phrase set from the document, phrases that do not contain at least one core word of the core word set; and
   extracting the key phrase set from the candidate key phrase set.

5. The method of claim 1 further comprising, selecting each of the corresponding phrase coefficients.

6. The method of claim 5 wherein the selecting each of the corresponding phrase coefficients is based on.

7. The method of claim 1 further comprising, associating the key phrase set with the document.

8. A system comprising:
   a computing device;
   a core word extractor configured to operate on the computing device, and further configured to select candidate core words from a document, and further configured to determine a feature value for each of a plurality of features of each of the selected candidate core words;
   a core word ranking mechanism configured to operate on the computing device, and further configured to calculate a score for each selected candidate core word, wherein each score is based on a linear sum S of each of the plurality of feature values of the each selected candidate core word, and wherein the each of the plurality of feature values is weighted according to a corresponding coefficient, and wherein the each score=exp(S)/exp(S)+1, and further configured to rank the selected candidate core words relative to one another based on the calculated scores;
   a key phrase extractor configured to operate on the computing device, and further configured to extract candidate key phrases from the document, and further configured to determine a phrase feature value for each of a plurality of phrase features of each extracted candidate key phrase; and
   a key phrase ranking mechanism configured to operate on the computing device, and further configured to calculate a phrase score for each extracted candidate key phrase, wherein each phrase score is based on a phrase linear sum P of each of the plurality of phrase feature values of the each selected candidate key phrase, and wherein the each of the plurality of phrase feature values is weighted according to a corresponding phrase coefficient, and wherein the each phrase score=exp(P)/exp(P)+1, and further configured to rank the selected candidate key phrases relative to one another based on the calculated phrase scores.

9. The system of claim 8 wherein the key phrase extractor is further configured to filter out, from a candidate key phrase set from the document, phrases that do not contain at least one core word of the core word set.

10. The system of claim 8 wherein the key phrase extractor is further configured to associate with each candidate key phrase at least one of the plurality of feature values of at least one of the core words of the selected core word set.

11. The system of claim 8 wherein at least one of the corresponding coefficients is based on training data.

12. At least one computer-readable storage medium having computer-executable instructions that, when executed by a computing device, cause the computing device to perform a method comprising:
   selecting candidate core words from a document;
   determining a feature value for each of a plurality of features of each of the selected candidate core words;
   calculating a score for each selected candidate core word, wherein each score is based on a linear sum S of each of the plurality of feature values of the each selected candidate core word, and wherein the each of the plurality of feature values is weighted according to a corresponding coefficient, and wherein the each score=exp(S)/exp(S)+1;
   ranking the selected candidate core words relative to one another based on the calculated scores;
   selecting M of the ranked candidate word set as a core word set from the document;
   selecting candidate key phrases from the document;
   determining a phrase feature value for each of a plurality of phrase features of each selected candidate key phrase; and associating with each candidate key phrase at least one of the plurality of feature values of at least one of the core words of the selected core word set;

calculating a phrase score for each selected candidate key phrase, wherein each phrase score is based on a phrase linear sum P of each of the plurality of phrase feature values of the each key phrase, and wherein the each of the plurality of phrase feature values is weighted according to a corresponding phrase coefficient, and wherein the each phrase score=exp(P)/exp(P)+1;

ranking the selected candidate key phrases relative to one another based on the calculated phrase scores.

13. The at least one computer-readable storage medium of claim 12 wherein the extracting the key phrase set comprises filtering out, from a candidate key phrase set from the document, phrases that do not contain at least one core word of the core word set.

* * * * *